United States Patent Office 3,663,633
Patented May 16, 1972

---

3,663,633
ALLENE CHLORINATION
Chester E. Pawloski, Bay City, and Russell L. Stewart, Midland, Mich., assignors to The Dow Chemical Company, Midland, Mich.
No Drawing. Filed Apr. 22, 1968, Ser. No. 723,243
Int. Cl. C07c 21/04
U.S. Cl. 260—654 H                   8 Claims

ABSTRACT OF THE DISCLOSURE

Propargyl chloride and 2,3-dichloropropene are the principal products in a process comprising reacting by contacting allene with chlorine in the presence of water, preferably at a temperature between 0 and 105° C. Both products are biologically active.

BACKGROUND OF THE INVENTION

It is known that propargyl chloride and 2,3-dichloropropene are the principal products in a process for chlorinating allene in the presence of an inert organic solvent at a temperature around −30° C. See U.S. 3,110,740.

It is also known that the reaction of excess allene with hypochlorous acid in the presence of a large amount of water (e.g. 90% by volume) at a preferred temperature between 0 and 20° C. yields monochloroacetone. See U.S. 2,856,430.

SUMMARY OF THE INVENTION

It has now been found that propargyl chloride and 2,3-dichloropropene are the principal products in a process comprising reacting by contacting allene with chlorine in the presence of water.

In order to practice the invention, allene and chlorine are reacted by contact, in any convenient manner, in the presence of water, preferably at a temperature between 0 and 105° C. A preferred method of conducting the reaction is the continuous method wherein water is fed into the upper portion of a vertical column reactor while chlorine and allene are fed into the lower portion, thus effecting a countercurrent liquid-gas contact reactor. In this method, it is preferred to introduce allene into the reactor at a point lower than the chlorine addition, but this is not critical and the reactants can be introduced at approximately the same point along the reactor or chlorine can be introduced at a point lower than allene. Of course, a batch process can also be employed; e.g. water is held in a reaction vessel and allene and chlorine are introduced therein. The principal products of the reaction, i.e. propargyl chloride and 2,3-dichloropropene, are separated from the reaction mixture by conventional methods, e.g. condensation, distillation and/or decantation.

Although the amount of reactants used in this process can be varied widely, the molar ratio of chlorine to allene is preferably at least one to one. Most preferably, allene and chlorine are reacted in equimolar amounts. The amount of water employed in this process can also be varied.

The temperature used in this process is suitably between 0 and 105° C. and preferably between 80 and 105° C. Most preferably, the temperature is around 100° C. The pressure employed can be subatmospheric, atmospheric or superatomspheric, but it is preferred to use pressures of at least one atmosphere.

The production of propargyl chloride and 2,3-dichloropropene from allene by chlorination occurs not only where pure allene is introduced into the reaction vessel, but also when allene-containing gaseous hydrocarbon mixtures are chlorinated by this process. For example, allene in mixture with any one or a combination of any two or more of (1) acetylenics such as acetylene, methylacetylene and other acetylenes having up to five carbon atoms, (2) olefinics such as ethylene, propylene, n-butene, cyclobutene, isobutene, butadiene and other olefins having up to eight carbon atoms and (3) alkanes such as methane, ethane, propane, n-butane, isobutane and other alkanes having up to eight carbon atoms, is chlorinated by this process to produce propargyl chloride and 2,3-dichloropropene. A preferred gaseous hydrocarbon mixture is one containing principally methylacetylene, allene and propane.

If desired, an aqueous solution of a metal chloride can be employed as a reaction medium so as to increase propargyl chloride production. Suitable metal chlorides include the chloride salts of sodium, potassium, calcium and magnesium. Typically, a substantially saturated solution of these metal chlorides is preferred.

In general, the acidity of the aqueous medium is related to the amount of propargyl chloride produced so that the more acidic the solution, the greater the propargyl chloride production. Thus, it is preferred to conduct the reaction in an acidic aqueous medium having a pH of 7 or less, e.g. hydrochloric acid, ammonium chloride, dimethylamine hydrochloride, or diethylamine hydrochloride solutions are especially useful to increase propargyl chloride production.

The propargyl chloride and 2,3-dichloropropene products of this reaction have known biological activity. For example, both compounds are active nematocides and are active entomologically.

DESCRIPTION OF SPECIFIC EMBODIMENTS

Example 1

Using a 600 ml. pot reactor equipped with a stirrer, heating coil, pressure release valve and inlet and exit ports, 500 ml. $H_2O$ was placed in the reactor and heated to 100° C. by steam in the heating coil of the reactor. Allene (1 g. per minute) and chlorine (1.8 g. per minute) were then introduced into the reactor so that they reacted, with stirring, in the aqueous medium. After two hours, the run was completed and a total of 120 g. of allene and 213 g. of chlorine had been added to the reactor. During the run, the water temperature had varied between 95 and 101° C. while the pressure within the reactor was between 8.0 and 8.5 p.s.i.g. Water was added throughout the run so that the water level remained essentially constant. The vaporous product leaving the reactor during the run was collected, condensed and combined with the liquid product phase remaining in the reactor and the resulting mixture, 211 g., was distilled to give 22 g. propargyl chloride and 54 g. of dichloropropenes (95% 2,3-dichloropropene). This represents a 9% yield of propargyl chloride based on allene fed to the reactor. No monochloroacetone or polychloroacetone was produced in this reaction.

Example 2

Into a 500 ml. flask reactor equipped with a magnetic stirrer, reflux condenser, chlorine feed pipe, allene feed pipe, constant temperature bath and thermometers, was placed 200 ml. of $H_2O$. The water was maintained at a temperature between 4 and 15° C. 27 g. of allene (0.675 mole) and 35 g. of chlorine (0.494 mole) were added to the flask within two hours and were reacted in the aqueous medium. After reaction, the product mixture was steam distilled to give 15.3 g. of product, 20% of which was propargyl chloride and 26% of which was 2,3-dichloropropene, by weight.

Example 3

Using a 4 foot by 2 inch I.D. vertical reactor equipped with a water jacket, pressure regulator and inlet and exit ports, 686 g. of chlorine (9.72 moles) was added to the reactor at a rate of 0.036 mole per minute while 417 g. of a mixture containing 34% allene and 34% methylacetylene, by weight, the remainder being mostly propane, was added at a rate of 0.038 mole per minute so that they reacted in an aqueous medium. The water within the reactor (2415 ml. initially, 750 ml. more were added during the reaction) was at a temperature between 70 and 95° C. while the pressure within the reactor was at 14 p.s.i.g. The vaporous product was collected and combined with the liquid product phase remaining in the reactor and the resulting mixture distilled to give 135 g. of product. Steam distillation of this product gave 10.03% propargyl chloride, 24.19% dichloropropenes (mostly 2,3-dichloropropene) and 25.37% 1,1-dichloroacetone, by weight, based on the crude product. This is a 13.1% yield of propargyl chloride based on allene fed to the reactor.

Example 4

Using the reactor and procedure described in Example 1, 53 g. of a mixture of allene and methylacetylene (45 g. allene) and 70 g. of chlorine were reacted in 500 ml. of water within the reactor. The pressure within the reactor was atmospheric and the temperature of the water varied between −1 and 7° C. The product, 39 g., contained 5%, by weight of propargyl chloride. This is a 10% yield of propargyl chloride based on allene fed.

Example 5

Using the reactor and procedure described in Example 1, 173 g. of a mixture of hydrocarbon gases containing predominantly allene, methylacetylene and propane (64 g. allene) and 192 g. of chlorine were reacted in 500 ml. of a 15% water solution of ammonium chloride during 120 minutes at 10–33° C. at 2–3 p.s.i.g. The product, 228 g., contained 7%, by weight, of propargyl chloride for an 11% yield of propargyl chloride based on allene fed.

We claim:

1. A process for making propargyl chloride and 2,3-dichloropropene which comprises reacting by contacting allene with chlorine in an aqueous reaction medium at a temperature between 80° and 105° C.
2. A process as defined in claim 1 wherein the pressure is at least one atmosphere.
3. A process as defined in claim 1 wherein the molar ratio of chlorine to allene is at least one to one.
4. A process as defined in claim 1 wherein the allene is in a gaseous hydrocarbon mixture with any one or a combination of any two or more of (1) acetylenics having up to five carbon atoms, (2) olefinics having up to eight carbon atoms or (3) alkanes having up to eight carbon atoms.
5. A process as defined in claim 4 wherein the allene is in mixture with methylacetylene and propane.
6. A process as defined in claim 5 wherein the temperature is 100–105° C.
7. A process as defined in claim 1 wherein the aqueous reaction medium is an aqueous solution of hydrochloric acid or ammonium chloride.
8. A process as defined in claim 1 wherein the aqueous reaction medium is an aqueous solution of sodium chloride, potassium chloride, calcium chloride or magnesium chloride.

References Cited

UNITED STATES PATENTS

| | | | |
|---|---|---|---|
| 2,077,382 | 4/1937 | Engs et al. | 260—654 HX |
| 2,973,393 | 2/1961 | Monroe | 260—654 H |
| 3,009,967 | 11/1961 | Monroe | 260—654 H |
| 3,110,740 | 11/1963 | Peer | 260—654 H |
| 2,856,430 | 10/1958 | Elam | 260—597 R |

LEON ZITVER, Primary Examiner

J. A. BOSKA, Assistant Examiner

U.S. Cl. X.R.

260—597 T